US012709449B2

(12) United States Patent
Okamoto et al.

(10) Patent No.: US 12,709,449 B2
(45) Date of Patent: Aug. 18, 2026

(54) WATER-SOLUBLE FILM AND PACKAGE

(71) Applicant: KURARAY CO., LTD., Okayama (JP)

(72) Inventors: Minoru Okamoto, Okayama (JP); Sayaka Shimizu, Okayama (JP); Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 565 days.

(21) Appl. No.: 18/003,797

(22) PCT Filed: Jun. 14, 2021

(86) PCT No.: PCT/JP2021/022540
§ 371 (c)(1),
(2) Date: Dec. 29, 2022

(87) PCT Pub. No.: WO2022/004346
PCT Pub. Date: Jan. 6, 2022

(65) Prior Publication Data

US 2023/0257174 A1 Aug. 17, 2023

(30) Foreign Application Priority Data

Jun. 29, 2020 (JP) ................................ 2020-111941

(51) Int. Cl.
*B65D 65/46* (2006.01)
*B65D 65/42* (2006.01)
(Continued)

(52) U.S. Cl.
CPC ............. *B65D 65/46* (2013.01); *B65D 65/42* (2013.01); *C08F 218/08* (2013.01); *C08J 5/18* (2013.01)

(58) Field of Classification Search
CPC ....... B65D 65/46; B65D 65/42; C08F 218/08; C08F 8/28; C08F 116/38; C08F 2800/20;
(Continued)

(56) References Cited

U.S. PATENT DOCUMENTS 5,484,881 A 1/1996 Gruber et al.
9,908,957 B2 3/2018 Mori et al.
(Continued)

FOREIGN PATENT DOCUMENTS

CN 104662071 A 5/2015
EP 3348608 A1 7/2018
(Continued)

OTHER PUBLICATIONS

Office Action issued in Chinese Patent Application No. 202180046089.3, dated May 14, 2025.
(Continued)

*Primary Examiner* — Shane Fang
(74) *Attorney, Agent, or Firm* — Morgan, Lewis & Bockius LLP

(57) ABSTRACT

[Problem to be solved] To provide a water-soluble film capable of suppressing formation of holes when used as a package while maintaining water solubility, and a package using such a water-soluble film.

[Solution] A water-soluble film containing a polyvinyl alcohol resin, wherein within a square A1 with a side of 1 cm or more and 5 cm or less positioned at an arbitrary location on at least one surface of the water-soluble film, each side of an area of square A2 with a side of 5 μm is divided into 64 to divide the entire area into 4096 pixels, and when elastic moduli of the pixels are measured by an atomic force microscope, a number average value of the elastic moduli of the pixels is 1 to 200 MPa, and a coefficient of variation of the elastic moduli of the pixels is 0.1 to 0.7.

19 Claims, 4 Drawing Sheets

(51) Int. Cl.
*C08F 218/08* (2006.01)
*C08J 5/18* (2006.01)

(58) Field of Classification Search
CPC ........ B32B 17/10036; B32B 17/10605; B32B 17/10761; B32B 27/08; B32B 27/22; B32B 27/306; B32B 2250/03; B32B 2250/05; B32B 2307/412; B32B 2315/08; B32B 2605/00; B32B 2605/08; C08K 5/06; C08K 5/09
See application file for complete search history.

(56) References Cited

U.S. PATENT DOCUMENTS

| | | | |
|---|---|---|---|
| 2004/0092635 A1 | 5/2004 | Kitamura et al. | |
| 2016/0194465 A1 | 7/2016 | Takafuji et al. | |
| 2016/0326285 A1* | 11/2016 | Mori | C08J 5/18 |
| 2018/0105338 A1* | 4/2018 | Ieda | B65D 65/42 |
| 2019/0002683 A1 | 1/2019 | Michitaka et al. | |
| 2019/0211289 A1 | 7/2019 | Friedrich et al. | |
| 2019/0300693 A1 | 10/2019 | Nii et al. | |
| 2019/0359795 A1 | 11/2019 | Sakai et al. | |
| 2021/0009774 A1 | 1/2021 | Ichiki | |
| 2021/0130576 A1 | 5/2021 | Kani | |
| 2021/0324156 A1 | 10/2021 | Okamoto et al. | |
| 2021/0324161 A1 | 10/2021 | Okamoto et al. | |
| 2021/0324162 A1 | 10/2021 | Okamoto et al. | |
| 2021/0324164 A1 | 10/2021 | Okamoto et al. | |
| 2022/0041824 A1 | 2/2022 | Okamoto et al. | |
| 2022/0204711 A1 | 6/2022 | Menozzi et al. | |

FOREIGN PATENT DOCUMENTS

| | | |
|---|---|---|
| EP | 3677405 A1 | 7/2020 |
| EP | 3904231 A1 | 11/2021 |
| EP | 3904435 A1 | 11/2021 |
| EP | 3904437 A1 | 11/2021 |
| JP | 2001-329130 A | 11/2001 |
| JP | 2003-206380 A | 7/2003 |
| JP | 2004-161823 A | 6/2004 |
| JP | 2005-179390 A | 7/2005 |
| JP | 2006-188655 A | 7/2006 |
| JP | 2006-188661 A | 7/2006 |
| JP | 2006-307059 A | 11/2006 |
| JP | WO2008/142835 A1 | 11/2008 |
| JP | 2008290406 A | 12/2008 |
| JP | 2009-051947 A | 3/2009 |
| JP | WO2009/028141 A1 | 3/2009 |
| JP | 2009154449 A | 7/2009 |
| JP | 2009-535484 A | 10/2009 |
| JP | WO2011/132592 A1 | 10/2011 |
| JP | 2012-082313 A | 4/2012 |
| JP | WO2013/146147 A1 | 10/2013 |
| JP | WO2015/020045 A1 | 2/2015 |
| JP | WO2015/118978 A1 | 8/2015 |
| JP | WO2016/190235 A1 | 12/2016 |
| JP | 2017-052841 A | 3/2017 |
| JP | 2017-078166 A | 4/2017 |
| JP | 2017-100806 A | 6/2017 |
| JP | 2017-533304 A | 11/2017 |
| JP | WO2018/008736 A1 | 1/2018 |
| JP | 2018-031015 A | 3/2018 |
| JP | WO2018/061272 A1 | 4/2018 |
| JP | 2018-154714 A | 10/2018 |
| JP | 2019-006423 A | 1/2019 |
| JP | 2019-014109 A | 1/2019 |
| JP | WO2019/124310 A1 | 6/2019 |
| JP | 2019177585 A | 10/2019 |
| JP | WO2019/189684 A1 | 10/2019 |
| JP | WO2020/004608 A1 | 1/2020 |
| JP | WO2020/027021 A1 | 2/2020 |
| JP | WO2020/138437 A1 | 7/2020 |
| JP | WO2020/138438 A1 | 7/2020 |
| JP | WO2020/138442 A | 7/2020 |
| JP | WO2020/138443 A1 | 7/2020 |
| KR | 10-0590311 B1 | 6/2006 |
| WO | 2007/133415 A1 | 11/2007 |
| WO | 2016/061054 A1 | 4/2016 |
| WO | 2016061026 A1 | 4/2016 |
| WO | 2017/110749 A1 | 6/2017 |
| WO | 2019/044751 A1 | 3/2019 |
| WO | 2020/027020 A1 | 2/2020 |
| WO | 2020138441 A1 | 7/2020 |
| WO | 2020138443 A1 | 7/2020 |
| WO | 2020138444 A1 | 7/2020 |
| WO | 2020/218321 A1 | 10/2020 |

OTHER PUBLICATIONS

Office Action issued in Chinese Patent Application No. 202180046093.X, dated Jun. 5, 2025.
Office Action issued in Chinese Patent Application No. 202180046098.2, dated May 21, 2025.
Office Action issued in corresponding Chinese Patent Application No. 202180046124.1, dated May 16, 2025.
Office Action issued in Chinese Patent Application No. 202180046095.9, dated Jan. 4, 2025.
Extended European Search Report issued in the related Application No. 21831690.9, mailed Jun. 26, 2024.
Extended European Search Report issued in the related Application No. 21831989.5, mailed Jun. 26, 2024.
Extended European Search Report issued in the related Application No. 21834693.0, mailed Jun. 19, 2024.
Extended European Search Report issued in the related Application No. 21831991.1, mailed Jun. 19, 2024.
Extended European Search Report issued in the corresponding Application No. 21833496.9, mailed Jun. 26, 2024.
"Basic Physical Properties of PVOH Resin: 1. Basic Physical Properties of POVH", kuraray.
Paneru et al., "Surface modification of PVA thin film by nonthermal atmospheric pressure plasma for antifoggin, AIP property", Jul. 10, 2019, AIP Advances 9, 075008.
Peng et al. "Influence of absorbed moisture on solubility of poly-(vinyl alcohol) film during atmospheric pressure plasma jet treatment", Surface & Coatings Technology, 204 (2010) 1222-1228.
Akhter et al., "XPS and IR Study of X-Ray Induced Degradation of PVA Polymer Film", Applied Surface Science, 1998-89, 241-258.
Sakurai, et al.,"Small-Angle X-ray Scattering Study of Lamellar Microdomains in a Block Copolymer," J Appl Cryst, 24: 679-684 (1991).
International Search Report issued in related International Patent Application No. PCT/JP2021/022536 dated Aug. 31, 2021.
International Search Report issued in related International Patent Application No. PCT/JP2021/022537 dated Aug. 17, 2021.
International Search Report issued in related International Patent Application No. PCT/JP2021/022538 dated Aug. 31, 2021.
International Search Report issued in related International Patent Application No. PCT/JP2021/022540 dated Jul. 13, 2021.
International Search Report issued in related International Patent Application No. PCT/JP2021/022535 dated Aug. 24, 2021.
International Search Report issued in related International Patent Application No. PCT/JP2021/022539 dated Aug. 31, 2021.
Office Action issued in related U.S. Appl. No. 18/003,791, dated Jul. 24, 2025.
Office Action issued in related U.S. Appl. No. 18/003,771, dated Aug. 6, 2025.
Office Action issued in Japanese Patent Application No. 2022-533806, dated Apr. 22, 2025.
Office Action issued in corresponding Japanese Patent Application No. 2022-533809, dated Apr. 22, 2025.
Office Action issued in related U.S. Appl. No. 18/003,782, dated Apr. 17, 2025.
Office Action issued in Chinese Patent Application No. 202180046093.X, dated Oct. 24, 2025.
Office Action issued in related U.S. Appl. No. 18/003,782, filed Oct. 23, 2025.

(56) References Cited

OTHER PUBLICATIONS

Office Action issued in related CN Application No. 202180046089.3, Action dated Sep. 19, 2025.
Office Action issued in corresponding CN Application No. 202180046124.1, dated Sep. 29, 2025.
Office Action issued in corresponding JP Application No. 2022-533809, dated Sep. 16, 2025.
Decision on Rejection issued in corresponding Chinese Patent Application No. 202180046124.1, dated Jan. 15, 2026.
Office Action issued in corresponding Japanese Patent Application No. 2022-533809, dated Mar. 3, 2026.
Office Action issued in related U.S. Appl. No. 18/003,785, dated Dec. 31, 2025.
Office Action issued in related U.S. Appl. No. 18/003,793, dated Mar. 25, 2026.
Office Action issued in related U.S. Appl. No. 18/003,771, dated Mar. 13, 2026.
Office Action issued in Chinese Patent Application No. 202180046089.3, dated Mar. 25, 2026.

* cited by examiner

WATER-SOLUBLE FILM AND PACKAGE

TECHNICAL FIELD

The present invention relates to a water-soluble film containing polyvinyl alcohol resin suitably used for packaging various chemicals and a package using the same.

RELATED ART

Conventionally, water-soluble films have been used in a wide range of applications, taking advantage of their excellent solubility in water, such as packaging of various chemicals such as liquid detergents and pesticides, and seed tapes encapsulating seeds. For water-soluble films to be used for such an application, polyvinyl alcohol resins (hereinafter, may be referred to as "PVA") are mainly used. Further, films with improved water solubility have been proposed by blending various additives such as plasticizers or by using modified polyvinyl alcohol.

In recent years, among these applications, the application of a water-soluble film to package chemicals such as household laundry detergents as a package has become widespread. In general, when producing such a package, the chemical is packaged while the water-soluble film is under tension, thereby suppressing wrinkles occurring in the package and often making the appearance of the package look good. However, such a tensioned package has a problem that a hole is easily opened in the package and contents of the package are easily leaked due to contact between packages or contact of a sharp part such as a corner of a solid chemical contained in a package with another package.

On the other hand, a measurement method using an atomic force microscope is known as a method for evaluating surface properties of plastic films such as PVA films. According to this measurement method, by measuring a surface of a measurement sample with an ultrafine sensing lever of about several nanometers, it is possible to evaluate the surface unevenness shape, elastic modulus, and the like of the measurement sample. For example, Patent document 1 describes that in a laminated film composed of two or more layers satisfying predetermined requirements, the AFM elastic modulus measured from the surface layer (A) side is 1900 to 2200 MPa. According to such a laminated film, it is possible to provide a film excellent in scratch resistance, moldability and dimensional stability, which could not be achieved by conventional techniques.

PRIOR ART DOCUMENT

Patent Document

Patent Document 1: JP-A 2019-14109

SUMMARY OF THE INVENTION

Problem to be Solved by the Invention

It is considered effective to improve the strength of the water-soluble film and suppress the perforation of the package against the problem of leakage of the contents of the package due to formation of holes in the package as described above. In order to improve the strength of the water-soluble film, there are a method of increasing the thickness of the water-soluble film and a method of heat-treating the water-soluble film at a high temperature. However, with these methods, it takes a long time for the water-soluble film to completely dissolve in water, which may impair the water solubility. That is, in the method of improving the strength of the water-soluble film, even if the perforation of the package can be suppressed, the water solubility of the water-soluble film may be impaired. Therefore, there has been a demand for a method capable of suppressing the formation of holes in a package while maintaining the water solubility of the water-soluble film. In the prior art, no study has been made on the relationship between the formation of holes when such a water-soluble film is used as a package and an elastic modulus when the water-soluble film is measured with an atomic force microscope.

Accordingly, an object of the present invention is to provide a water-soluble film capable of suppressing formation of holes when used as a package while maintaining water solubility, and a package using such a water-soluble film.

Means for Solving the Problem

As a result of extensive studies by the present inventors, the inventors have found that the above object is achieved by setting a number average value and a coefficient of variation of an elastic modulus obtained to a specific range when the elastic modulus of a surface of a water-soluble film is measured with an atomic force microscope in a micrometer-order measurement area. Based on this knowledge, the inventors have further studied and completed the present invention.

That is, the present invention relates to:

[1] A water-soluble film containing a polyvinyl alcohol resin, wherein within a square A1 with a side of 1 cm or more and 5 cm or less positioned at an arbitrary location on at least one surface of the water-soluble film, each side of an area of square A2 with a side of 5 μm is divided into 64 to divide the entire area into 4096 pixels, and when elastic moduli of the pixels are measured by an atomic force microscope, a number average value of the elastic moduli of the pixels is 1 to 200 MPa, and a coefficient of variation of the elastic moduli of the pixels is 0.1 to 0.7.

Further, the present invention relates to:

[2] The water-soluble film in the above-mentioned item [1], wherein the square A1 is positioned in a central portion of a width direction of the water-soluble film;

[3] The water-soluble film in the above-mentioned item [1] or [2], wherein the square A2 is positioned in at least one central portion or vertex of the square A1;

[4] The water-soluble film in the above-mentioned item [3], wherein the square A2 is positioned at the central portion and four vertices of the square A1;

[5] The water-soluble film in any one of the above-mentioned items [1] to [4], wherein the side of the square A1 is 1 cm; and

[6] The water-soluble film in any one of the above-mentioned items [1] to [5], wherein the number average value of the elastic moduli is from 1 to 200 MPa and the coefficient of variation of the elastic moduli is from 0.1 to 0.7 on both surfaces of the water-soluble film.

Furthermore, the present invention relates to:

[7] A package in which the water-soluble film described in any one of the above mentioned items [1] to [6] stores a chemical;

[8] The package in the above-mentioned item [7], wherein the chemical is a pesticide, a detergent or a disinfectant; and

[9] The package in the above-mentioned item [7] or [8], wherein the chemical is in a liquid form.

Effects of the Invention

According to the present invention, it is possible to provide a water-soluble film capable of suppressing formation of holes when used as a package while maintaining water solubility, and a package using such a water-soluble film.

BRIEF DESCRIPTION OF THE DRAWINGS

FIG. 3 is a schematic diagram showing a preferred position of the square A1 when measuring the elastic modulus of the surface of the long water-soluble film with the atomic force microscope.

MODE FOR CARRYING OUT THE INVENTION

The present invention is specifically described below.

<AFM Measurement>

Figure 1:
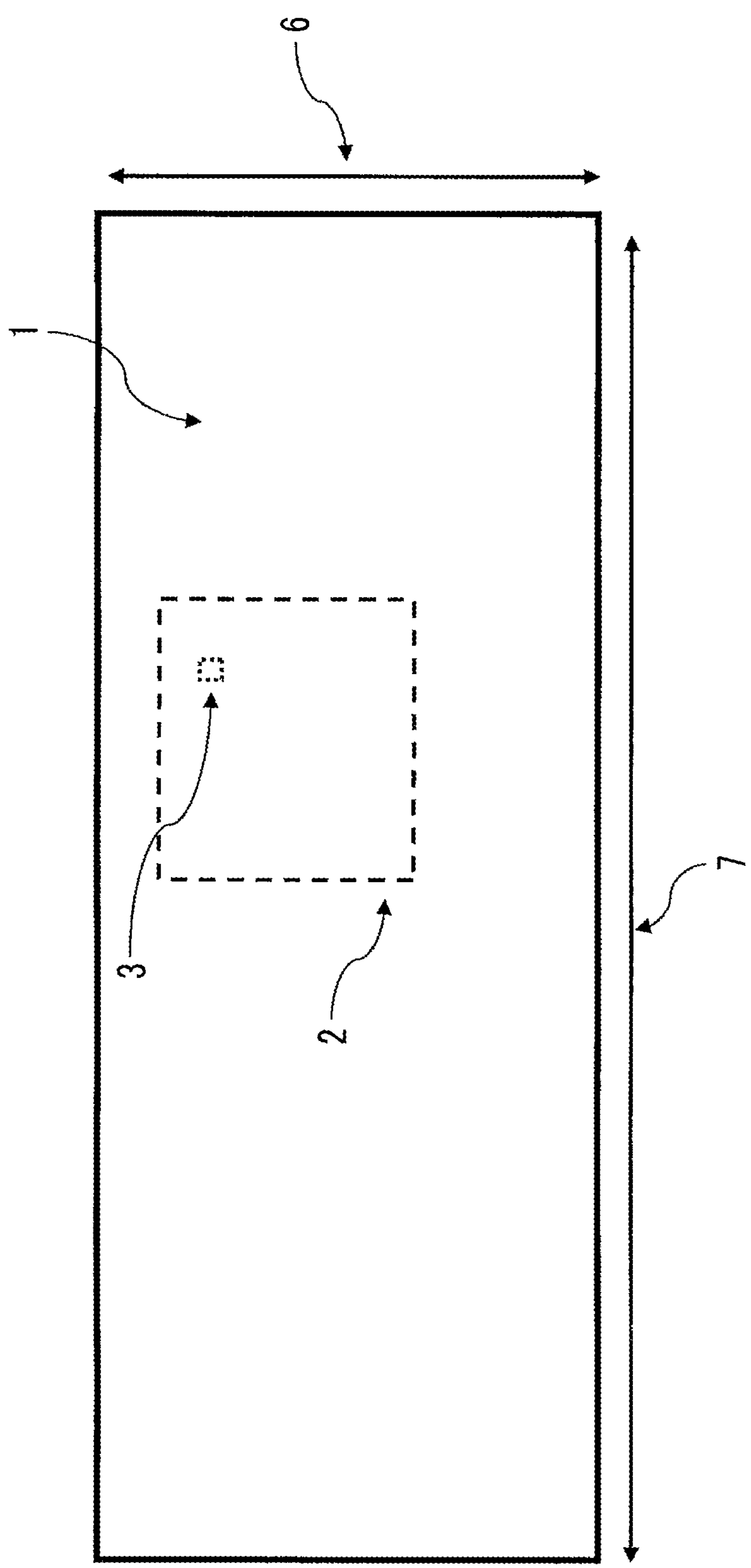
FIG. 1 is a schematic diagram showing a square A1 and a square A2 when measuring an elastic modulus of a surface of a long water-soluble film with an atomic force microscope.

In the present invention, an elastic modulus of a surface of a water-soluble film is measured using an atomic force microscope (hereinafter, may be referred to as "AFM"). In the present invention, as shown in FIG. 1, on at least one surface of the water-soluble film, an area of a square A2 with a side of 5 μm within a square A1 with a side of 1 cm to 5 cm is measured by the AFM. Although the water-soluble film in FIG. 1 shows a long film, the shape of the film is not limited to this. Also, in FIG. 1, the scale of the square A2 is different from an actual scale for the sake of convenience.

Figure 2:
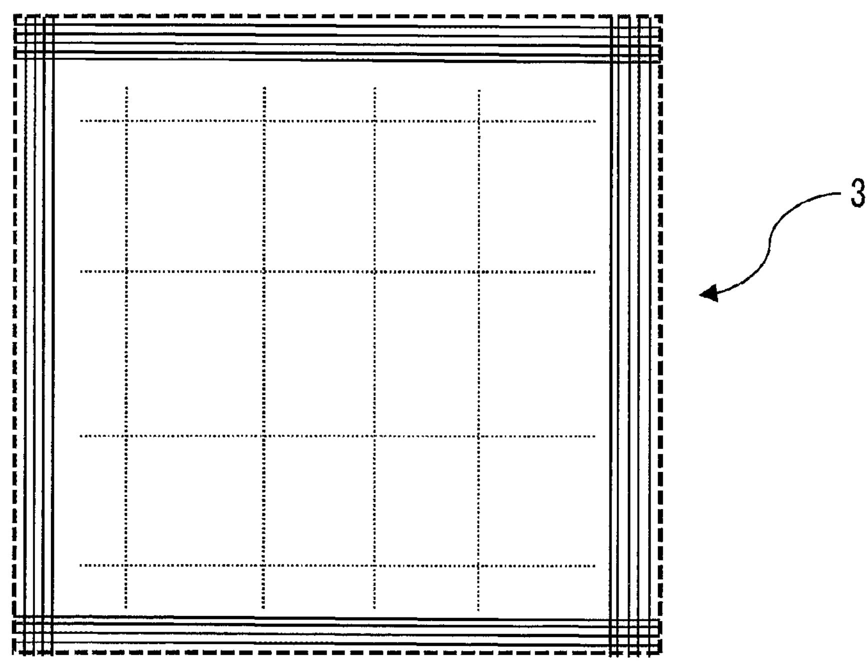
FIG. 2 is a schematic diagram in which each side of an area of the square A2 is divided into 64 and the entire area is divided into 4096 pixels.

For AFM measurements, as shown in FIG. 2, each side of square A2 with a side of 5 μm is divided into 64, and the entire square A2 is divided into 4096 (64×64=4096) pixels. From the viewpoint of reproducibility of measurement results obtained by the AFM, the 64 divisions are preferably equal divisions, and each pixel is preferably square. At each of the 4096 pixels thus divided, an elastic modulus of the surface of the water-soluble film is measured by AFM. Therefore, in the present invention, by measuring one square A2 with the AFM, 4096 values are obtained for the elastic modulus of the surface of the water-soluble film according to the number of pixels. The water-soluble film of the present invention has a number average value of 4096 elastic moduli obtained in this manner (hereinafter, may be simply referred to as "elastic moduli") of 1 to 200 MPa, and a coefficient of variation of 0.1 to 0.7. Here, the coefficient of variation is a value obtained by dividing the standard deviation (σ) of the 4096 elastic moduli obtained in this manner by the number average value (σ/number average value).

The water-soluble film of the present invention has the number average value of elastic moduli of 1 to 200 MPa. When the number average value of the elastic moduli exceeds 200 MPa, the water-soluble film tends to lose its water solubility because a large amount of hard PVA crystals are present in the water-soluble film. On the other hand, when the number average value of the elastic moduli is less than 1 MPa, the water-soluble film is softened due to presence of many soft amorphous portions of the PVA in the water-soluble film, and the formation of holes are likely to occur when the film is used as a package. The number average value of elastic moduli is preferably 175 MPa or less, more preferably 170 MPa or less. Also, the number average value of the elastic moduli is preferably 5 MPa or more, more preferably 10 MPa or more, and even more preferably 15 MPa or more.

In the water-soluble film of the present invention, the coefficient of variation of elastic moduli is 0.1 to 0.7. When the coefficient of variation of the elastic moduli exceeds 0.7, even if the number average value of the elastic moduli of the water-soluble film is within the above range, the formation of holes are likely to occur in the package. On the other hand, when the coefficient of variation of the elastic modulus is less than 0.1, there is a possibility that a production cost for producing the water-soluble film becomes large. The coefficient of variation of the elastic moduli is preferably 0.65 or less, and more preferably 0.60 or less, from the viewpoint of being able to further suppress the formation of holes in the package. In addition, from the viewpoint of further reducing the production cost when producing the water-soluble film, the coefficient of variation of the elastic moduli is preferably 0.12 or more, more preferably 0.15 or more, and even more preferably 0.18 or more.

Figure 3:
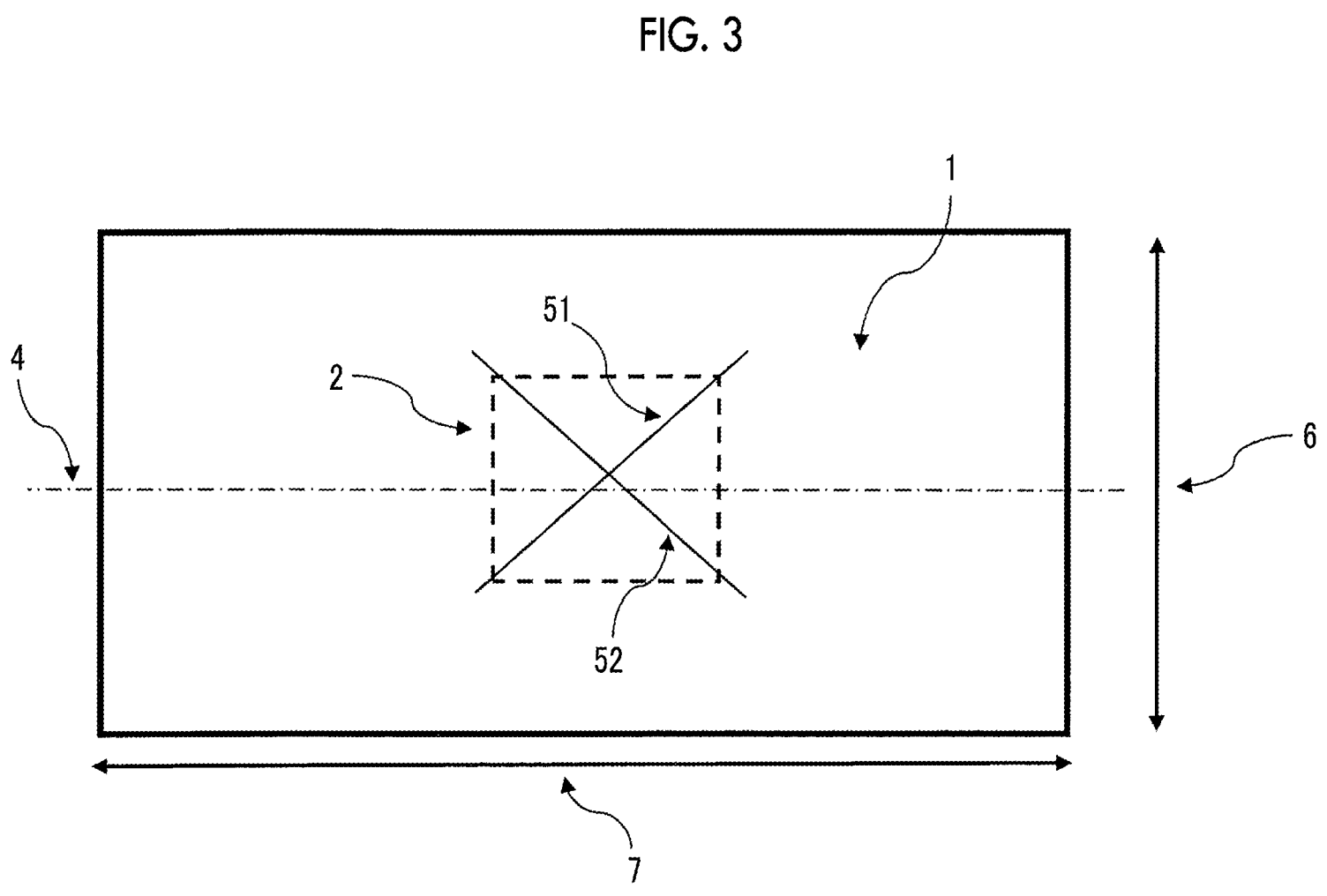

In the present invention, the square A1 is positioned at an arbitrary location on at least one surface of the water-soluble film. That is, the position of the square A1 is appropriately selected from arbitrary positions on the at least one surface of the water-soluble film according to the shape of the water-soluble film. From the viewpoint of the reproducibility of the measurement results obtained by the AFM, as shown in FIG. 1, it is preferable that the square A1 is positioned in a central portion in a width direction of the water-soluble film. Here, the width direction of the water-soluble film refers to a direction orthogonal to a machine flow direction (MD direction) in manufacturing the water-soluble film, that is, the TD direction. Further, the fact that the square A1 is positioned at the central portion of the water-soluble film in the width direction (TD direction) means that as shown in FIG. 3, a shortest distance between an intersection of diagonals of the square A1 and a straight line that bisects the width direction (TD direction) of the water-soluble film is within 0.1 cm. The machine flow direction (MD direction) or the width direction (TD direction) of the water-soluble film can be determined after the production of the water-soluble film by measuring retardation spots of the water-soluble film.

In the present invention, one side of the square A1 is 1 cm or more and 5 cm or less. That is, the one side of the square A1 is appropriately selected within the range of 1 to 5 cm depending on the shape of the water-soluble film. The one side of the square A1 is more preferably 1 to 3 cm, and even more preferably 1 cm. The square A1 may be formed in one place or in multiple places.

In the present invention, the position of the square A2 is not particularly limited as long as it is within the square A1, but from the viewpoint of the reproducibility of the measurement results obtained by the AFM, the square A2 is preferably positioned at least at the central portion or a vertex of the square A1. Here, the fact that the square A2 is positioned in the central portion of the square A1 means that the distance between the intersection of the diagonals of the square A2 and the intersection of the diagonals of the square A1 is within 0.1 mm. Also, the fact that the square A2 is positioned at the vertex of the square A1 means that the distance between the intersection of the diagonal lines of the square A2 and the vertex of the square A1 is within 0.1 mm.

Figure 4:
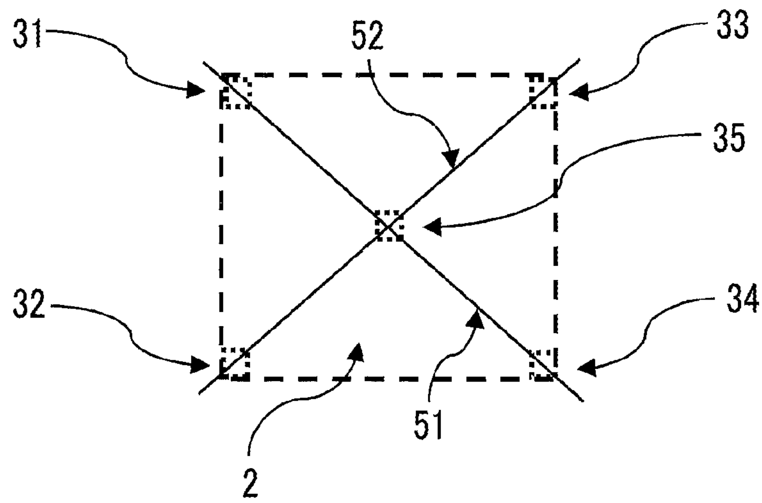
FIG. 4 is a schematic diagram showing preferred positions of the squares A2 within the square A1.

The square A2 may be formed in one place or in multiple places, but from the viewpoint of the reproducibility of the measurement results obtained by AFM, as shown in FIG. 4, the square A2 is preferably positioned at the central portion and four vertices of the square A1. That is, in the present invention, it is preferable to measure the elastic modulus of the surface of the water-soluble film by the AFM at a total of 5 points in the central portion of the square A1 and square A2 positioned at the four vertices. Note that in FIG. 4, the scale of the square A2 is different from the actual scale for the sake of convenience.

As described above, the water-soluble film of the present invention has the number average value of the elastic moduli of 1 to 200 MPa and the coefficient of variation of the elastic moduli of 0.1 to 0.7 on at least one surface. When a particulate solid chemical with sharp corners is packaged to form a package, the water-soluble film preferably has the number average value of the elastic moduli of 1 to 200 MPa and the coefficient of variation of 0.1 to 0.7 on both surfaces of the water-soluble film so that it is possible to further suppress the occurrence of the formation of holes from the inside of the package. The positions of the squares A1 and A2 are as described above even when the number average value and the coefficient of variation of the elastic moduli of both surfaces of the water-soluble film are measured by the AFM.

A complete dissolution time when the water-soluble film of the present invention is immersed in water at 10° C. is preferably 90 seconds or less. Since the complete dissolution time is 90 seconds or less, it can be suitably used as a packaging film for chemicals such as liquid detergents, pesticides and the like. The complete dissolution time is more preferably 70 seconds or less, even more preferably 55 seconds or less, and particularly preferably 45 seconds or less. On the other hand, a lower limit of the complete dissolution time is not particularly limited, but the water-soluble film whose complete dissolution time is too short tends to absorb moisture in the air, causing blocking between the water-soluble films, and tends to decrease the strength of the water-soluble film. Therefore, the complete dissolution time is preferably 5 seconds or more, more preferably 10 seconds or more, even more preferably 15 seconds or more, and particularly preferably 20 seconds or more.

The complete dissolution time when the water-soluble film is immersed in water at 10° C. can be measured as follow <1> to <5>. In this regard, deionized water is used as water in the complete dissolution time measurement.

<1> The water-soluble film is place in a thermo-hygrostat adjusted to 20° C.-65% RH for 16 hours or more to condition the humidity.

<2> After cutting out a rectangular sample of length 40 mm×width 35 mm from the humidity-conditioned water-soluble film, the sample is sandwiched and fixed between two plastic plates of 50 mm×50 mm with rectangular windows (holes) of 35 mm length×23 mm width so that the longitudinal direction of the sample is parallel to the longitudinal direction of the window and the sample is positioned substantially at the center of the window in the width direction.

<3>300 mL of deionized water is poured into a 500 mL beaker and adjust the water temperature to 10° C. while stirring with a magnetic stirrer equipped with a 3 cm long bar at 280 rpm.

<4> The sample fixed to the plastic plate in <2> above is immersed in the deionized water in the beaker while being careful not to let it come into contact with the bar of the magnetic stirrer.

<5> The time from immersion in the deionized water until the sample immersed in the deionized water completely disappears is measured.

The complete dissolution time measured by the above method depends on the thickness of the sample, but in this specification, the complete dissolution time is defined as the complete dissolution of the sample of the above size regardless of the thickness.

A thickness of the water-soluble film of the present invention is not necessarily limited, but if the thickness is too thick, the water solubility tends to be impaired. Therefore, the thickness is preferably 100 μm or less, more preferably 80 μm or less, even more preferably 60 μm or less, and particularly preferably 50 μm or less. In addition, if the thickness of the water-soluble film is too thin, the formation of holes are likely to occur when it is used as a package. Therefore, the thickness is preferably 5 μm or more, more preferably 10 μm or more, even more preferably 15 μm or more, and particularly preferably 20 μm or more. In this regard, the thickness of the water-soluble film can be obtained by measuring the thickness at 10 arbitrary points (for example, 10 arbitrary points on a straight line drawn in the length direction of the water-soluble film) and calculating the average value thereof.

<Polyvinyl Alcohol Resin>

The water-soluble film of the present invention contains PVA. As the PVA, a polymer produced by saponifying a vinyl ester polymer obtained by polymerizing a vinyl ester monomer can be used. Examples of vinyl ester monomers include vinyl formate, vinyl acetate, vinyl propionate, vinyl valerate, vinyl laurate, vinyl stearate, vinyl benzoate, vinyl pivalate, and vinyl versatate, and the like. Among them, vinyl acetate is preferable as the vinyl ester monomer.

The vinyl ester polymer is preferably obtained using only one or two or more kinds of vinyl ester monomer as a monomer and more preferably obtained using only one kind of vinyl ester monomer as the monomer, and may be a copolymer of one or two or more kinds of vinyl ester monomer and other monomer copolymerizable therewith.

Examples of such other monomer copolymerizable with the vinyl ester monomer include, for example, ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like. The vinyl ester polymer may have a structural unit derived from one or two or more kinds of the other monomer above.

From the viewpoint of the water solubility and suppression of the formation of holes of the water-soluble film, the ratio of structural units derived from other monomer in the vinyl ester polymer is preferably 15 mol % or less, more preferably 5 mol % or less, based on the number of moles of all structural units constituting the vinyl ester based polymer.

A degree of polymerization of the PVA is not particularly limited, but from the viewpoint of the strength of the water-soluble film, the degree of polymerization is preferably 200 or more, more preferably 300 or more, and even more preferably 500 or more. On the other hand, the degree of polymerization is preferably 8,000 or less, more preferably 5,000 or less, and even more preferably 3,000 or less from the viewpoint of PVA productivity, productivity of the water-soluble film, water solubility of the water-soluble film and the like. Here, the degree of polymerization means the average degree of polymerization ($P_o$) measured in accordance with the description of JIS K 6726-1994, and the degree of polymerization is determined by the following formula from the intrinsic viscosity [η] (unit: deciliter/g) measured in water at 30° C. after resaponifying and purifying of the PVA.

$$\text{Degree of polymerization } P_o=([\eta]\times10^4/8.29)^{(1/0.62)}$$

In the present invention, the degree of saponification of the PVA is preferably 64 to 96 mol %. By adjusting the degree of saponification to the above range, it is easy to suppress the formation of holes in the package while maintaining the water solubility of the water-soluble film. The degree of saponification is more preferably 70 mol % or more, and even more preferably 75 mol % or more. On the other hand, the degree of saponification is more preferably 95 mol % or less, and even more preferably 94 mol % or less. In this context, the degree of saponification of the PVA means a ratio (mol %) indicating the number of moles of the vinyl alcohol units based on the total number of moles of the structural units (typically, vinyl ester based monomer units) that may be converted to vinyl alcohol units by saponification and the vinyl alcohol units in the PVA. The degree of saponification of the PVA can be measured in accordance with the description of JIS K6726-1994.

The water-soluble film of the present invention may contain one type of PVA singly or may contain two or more types of PVA having different degrees of polymerization, saponification, modification, and the like.

In the present invention, an upper limit of a content of the PVA in the water-soluble film is not particularly limited, but a lower limit of the content of the PVA is preferably 50% by mass, more preferably 80% by mass, and even more preferably 85% by mass.

<Plasticizer>

In the state of containing no plasticizer, the water-soluble film is rigid compared with other plastic films and sometimes have problems of the mechanical properties, such as impact strength, processability during secondary processing, and the like. To prevent these problems, the water-soluble film of the present invention preferably contains a plasticizer. Examples of preferred plasticizers include polyhydric alcohols, and specific examples include polyhydric alcohols, such as ethylene glycol, glycerin, diglycerin, propylene glycol, diethylene glycol, triethylene glycol, tetraethylene glycol, trimethylolpropane, sorbitol, and the like. One kind of these plasticizers may be singly used or two or more kinds of them may be used together. Among these plasticizers, from the viewpoint of not readily bleeding out to the surface of the film and the like, ethylene glycol or glycerin are preferable and glycerin is more preferable. By adding the plasticizer to a film forming stock solution for the water-soluble film, the resulting water-soluble film can contain the plasticizer.

By adjusting a content of the plasticizer to be contained in the film forming stock solution for forming the water-soluble film, the number average value and the coefficient of variation of the elastic moduli of the surface of the water-soluble film can be adjusted. Although the reason is not necessarily clear, it is presumed as follows. That is, by adjusting the content of the plasticizer in the film forming stock solution, mobility of molecular chains of the PVA is adjusted during the production of the water-soluble film, and the degree of crystallization of the PVA is adjusted. As a result, the crystallinity of the surface of the water-soluble film can be adjusted, and the number average value and coefficient of variation of the elastic moduli of the surface of the water-soluble film can be adjusted. From this point of view, the content of the plasticizer in the PVA film is preferably 1 parts by mass or more, more preferably 3 parts by mass or more, and even more preferably 5 parts by mass or more with respect to 100 parts by mass of the PVA contained in the water-soluble film. On the other hand, the content of the plasticizer is preferably 70 parts by mass or less, more preferably 50 parts by mass or less, and even more preferably 40 parts by mass or less. If the content of the plasticizer in the water-soluble film is too low, it is considered that the molecular chains of the PVA become difficult to move during the production of the water-soluble film, and the crystallization of the PVA becomes difficult to progress. In addition, the flexibility of the water-soluble film is lowered, which may cause problems such as the formation of holes. On the other hand, when the content of the plasticizer in the water-soluble film is too high, the interaction between the plasticizer and the molecular chains of the PVA becomes too strong during the production of the water-soluble film, inhibiting the crystallization of PVA. In addition, the water-soluble film may become too flexible, resulting in poor handleability, or the plasticizer may bleed out to the surface of the water-soluble film.

<Starch/Water-Soluble Polymer>

For the purpose of imparting mechanical strength to the water-soluble film or maintaining the handleability of the water-soluble film, or the like, the water-soluble film of the present invention may contain starch and/or a water-soluble polymer other than PVA.

Examples of the starch include natural starches, such as corn starch, potato starch, sweet potato starch, wheat starch, rice starch, tapioca starch, and sago starch; processed starches subjected to etherification, esterification, oxidation, and the like; and the like, and processed starches are more preferable.

A content of starch in the water-soluble film is preferably 15 parts by mass or less, and more preferably 10 parts by mass or less with respect to 100 parts by mass of the PVA. When the content of the starch exceeds 15 parts by mass, there is a risk that processability may deteriorate during the production of the water-soluble film.

Examples of the water-soluble polymers other than the PVA include dextrin, gelatin, glue, casein, shellac, gum arabic, polyacrylic acid amide, sodium polyacrylate, polyvinyl methyl ether, copolymers of methyl vinyl ether and maleic anhydride, Copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

A content of the water-soluble polymer other than the PVA in the water-soluble film is preferably 15 parts by mass or less, and more preferably 10 parts by mass or less with respect to 100 parts by mass of the PVA. When the content exceeds 15 parts by mass, the water solubility of the water-soluble film may be impaired.

<Surfactant>

In the water-soluble film of the present invention, it is preferable to contain a surfactant in the water-soluble film from the viewpoint of improving handleability and peelability from the film forming apparatus when producing the water-soluble film. The type of surfactant is not particularly limited, and examples thereof include anionic surfactants and nonionic surfactants.

Examples of the anionic surfactants include carboxylic acid type surfactants such as potassium laurate; sulfate type surfactants such as octyl sulfate; and sulfonic acid type surfactants such as dodecylbenzenesulfonate.

Examples of the nonionic surfactants include polyoxyalkylenealkyl ether type surfactants such as polyoxyethylene lauryl ether and polyoxyethylene oleyl ether; polyoxyalkylenealkyl alkylphenyl ether type surfactants such as polyoxyethylene octylphenyl ether; polyoxyalkylenealkyl alkyl ester type surfactants such as polyoxyethylene laurate; polyoxyalkylenealkyl alkyl amine type surfactants such as polyoxyethylene lauryl amino ether; polyoxyalkylenealkyl alkyl amide type surfactants such as polyoxyethylene lauric acid amide; polyoxyalkylenealkyl polypropylene glycol ether type surfactants such as polyoxyethylene polyoxypropylene ether; alkanolamide type surfactants such as lauric acid diethanolamide and oleic acid diethanolamide; and polyoxyalkylenealkyl allyl phenyl ether type surfactants such as polyoxyalkylene allyl phenyl ether, and the like.

Such surfactants may be used singly or in combination of two or more. Among these surfactants, nonionic surfactants are preferred, alkanolamide surfactants are more preferred, and dialkanolamides of aliphatic carboxylic acids (e.g., saturated or unsaturated aliphatic carboxylic acids having 8 to 30 carbon atoms) (e.g., diethanolamide, etc.) are even more preferred because these can further reduce film surface abnormalities that occur during the production of water-soluble films.

A content of the surfactant in the water-soluble film is preferably 0.01 parts by mass or more, more preferably 0.02 parts by mass, and even more preferably 0.05 parts by mass with respect to 100 parts by mass of the PVA. On the other hand, the content of the surfactant is preferably 10 parts by mass or less, more preferably 1 parts by mass or less, even more preferably 0.5 parts by mass or less, and particularly preferably 0.3 parts by mass or less. When the content of the surfactant is less than 0.02 parts by mass, the peelability from the film forming apparatus may become poor when producing the water-soluble film. In addition, blocking is likely to occur between the water-soluble films. On the other hand, if the content of the surfactant is more than 1 parts by mass, the surfactant tends to bleed out to the surface of the water-soluble film, or the appearance of the water-soluble film tends to deteriorate due to aggregation of the surfactant.

<Other Components>

The water-soluble film of the present invention may contain components such as moisture, antioxidants, UV absorbers, lubricants, cross-linking agents, coloring agents, fillers, preservatives, antifungal agents, and other polymer compounds other than the plasticizer, the starch, the water-soluble polymer other than the PVA, and the surfactant, as long as they do not interfere with the effects of the present invention. A ratio of the total weight of the PVA, plasticizer, starch, water-soluble polymer other than PVA, and surfactant to the total weight of the water-soluble film of the present invention is preferably in the range of 60 to 100% by mass, more preferably in the range of 80 to 100% by mass, and even more preferably in the range of 90 to 100% by mass.

<Method for Producing Water-Soluble Film>

The method for producing the water-soluble film of the present invention is not particularly limited to. The method may be an arbitrary method, such as a film formation method where a solvent, additives, and the like are added to the PVA and homogenized to obtain a film forming stock solution to be used in casting film formation, wet film formation (discharge into a poor solvent), dry/wet film formation, gel film formation (a method of extracting and removing the solvent after once cooling and gelling the film forming stock solution to obtain the water-soluble film), and combination thereof, melt extrusion film formation where the above film forming stock solution thus obtained is extruded from a T die or the like using an extruder or the like, inflation molding, and the like. Among the methods described above, the casting film-forming method and the melt extrusion film-forming method are preferable because the homogeneous water-soluble film can be obtained with high productivity. The casting film-forming method or the melt extrusion film-forming method for the water-soluble film will be described below.

In a case of forming the water-soluble film by casting film-formation method or melt extrusion film-formation method, the above film forming stock solution is heated to remove the solvent and thus solidified to be formed into a film. The solidified film is released from the support, dried as needed by a drying roll, a drying furnace, and the like, and further heat treated as needed to be wound and thus allowed to be produced into a long water-soluble film in a roll.

The film forming stock solution is preferably filtered through a filter medium with a metal mesh equivalent to 50 to 600 mesh before being poured onto the support such as a metal roll or metal belt. By filtering the film forming stock solution with such a filter medium, fine particles having an appropriate particle size are present in the film forming stock solution. In the production of the water-soluble film, such fine particles function as a crystal nucleating agent, so that the crystallinity of the surface of the water-soluble film can be adjusted. As a result, it is presumed that the number average value and the elastic modulus of the surface of the water-soluble film can be adjusted. When the filter medium is coarser than 50 mesh, it may be difficult to adjust the number average value and the coefficient of variation of the elastic moduli of the surface of the water-soluble film. In addition, foreign matter defects may Occur in the water-soluble film, which may deteriorate the appearance of the water-soluble film or reduce the strength of the water-soluble film. In addition, when the filter medium is finer than 600 mesh, it may be difficult to adjust the number average value and the elastic modulus of the surface of the water-soluble film, or clogging of the filter medium may reduce the productivity of the water-soluble film. The filter medium for filtering the filter forming stock solution preferably has 100 to 550 mesh, more preferably 200 to 500 mesh, and even more preferably 300 to 475 mesh. The type of fine particles in the film-forming stock solution is not particularly limited, and examples thereof include organic substances such as undissolved PVA and acrylic emulsions, and inorganic substances such as metals and silicon dioxide, but undissolved PVA resin is preferable from the viewpoint of the transparency of the water-soluble film.

The film forming stock solution poured onto the support in the form of a film (hereinafter, may be referred to as "PVA film") is dried and solidified on the support and then in a drying oven or on a drying roll to form the water-soluble film. At this time, the film forming stock solution cast on the support or the PVA film on the drying roll or the like is dried in a state having a high volatile content, thereby increasing the mobility of the molecular chains of the PVA during the production of the water-soluble film, so that the crystallization of the PVA is facilitated. As a result, the crystallinity of the surface of the water-soluble film tends to increase, and the number average value and the coefficient of variation of the elastic moduli of the surface of the water-soluble film tend to increase. On the other hand, if the drying speed is too high, the PVA crystals may not grow sufficiently during the production of the water-soluble film, and the crystallinity of the surface of the water-soluble film may be insufficient. As a result, the number average value and the coefficient of variation of the elastic moduli of the surface of the water-soluble film tend to be small. Further, when the drying rate is slow, the PVA crystals grow during the production of the water-soluble film, and the crystallite size of PVA tends to increase. As a result, the coefficient of variation of the elastic moduli of the surface of the water-soluble film tends to increase. On the other hand, if too much heat is applied during drying, the degree of crystallinity of the surface of the water-soluble film increases, and the number average value and the coefficient of variation of the elastic moduli of the surface of the water-soluble film tend to increase. In addition, the water solubility of the water-soluble film is likely to be impaired.

A volatile content ratio of the film forming stock solution (concentration of the volatile components, such as the solvent removed by volatilization and evaporation during film formation and the like) is preferably in the range of 50 to 90% by mass and more preferably in the range of 55 to 80% by mass. The volatile content ratio of less than 50% by mass causes an increase in the viscosity of the film forming stock solution and sometimes causes difficulty in film formation of the water-soluble film. Meanwhile, the volatile content ratio of more than 90% by mass causes a decrease in the viscosity of the film forming stock solution and is likely to impair uniformity in the thickness of the water-soluble film to be obtained.

As used herein, the term "volatile content ratio of the film forming stock solution" refers to a value obtained by the following formula.

$$\text{Volatile content ratio (\% by mass) of film forming stock solution} = \{(Wa-Wb)/Wa\}\times 100$$

In the formula, Wa represents the mass (g) of the film forming stock solution, and Wb represents the mass (g) after drying the film forming stock solution of Wa (g) in an electric heat dryer at 105° C. for 16 hours.

Examples of the method of preparing the film forming stock solution include, but not particularly limited to, a method where the PVA and the additives such as a plasticizer, a surfactant and the like are dissolved in a dissolution tank or the like, a method where the PVA in a hydrated state is melt kneaded together with a plasticizer, a surfactant, and the like, using a single-screw extruder or twin-screw extruder, and the like. Among them, the method of dissolving in the dissolution tank or the like or the method of using the twin-screw extruder is preferable because the number average value and the coefficient of variation of the elastic moduli of the surface of the water-soluble film can be easily adjusted.

The surface temperature of the support onto which the film forming stock solution is poured is preferably 50 to 110° C. When the surface temperature of the support is less than 50° C., the PVA film may be dried slowly, resulting in excessive crystallization of PVA. As a result, the degree of crystallinity of the surface of the water-soluble film increases, and the number average value and the coefficient of variation of the elastic moduli of the surface of the water-soluble film may become too large. Moreover, the water solubility of the water-soluble film may be impaired. Furthermore, the crystallite size of the PVA may become too large, and the coefficient of variation of the elastic moduli of the surface of the water-soluble film may become too large. On the other hand, when the surface temperature of the support exceeds 110° C., the PVA film may be dried rapidly, resulting in an excessive amount of amorphous components in the PVA. As a result, the degree of crystallinity of the surface of the water-soluble film decreases, and the number average value and the coefficient of variation of the elastic moduli of the surface of the water-soluble film may become too small. In addition, when the PVA film is dried, there are cases in which abnormalities such as foaming occur on the film surface. The surface temperature of the support is preferably 60 to 100° C., more preferably 65 to 95° C.

At the same time as heating the PVA film on the support, a drying rate may be adjusted by uniformly blowing hot air at a wind speed of 1 to 10 m/sec to the entire area of a non-contact surface side of the PVA film with the support. The crystalline state of the PVA film can be adjusted by blowing hot air. As a result, the crystallinity of the surface of the water-soluble film can be adjusted, and the number average value and the coefficient of variation of the elastic moduli of the surface of the water-soluble film can be adjusted. When the speed of the hot air is too high or the temperature is too high, the degree of crystallinity of the surface of the water-soluble film may become small, and the number average value and the coefficient of variation of the elastic moduli of the surface of the water-soluble film may become too small. On the other hand, if the speed of the hot air is too slow or the temperature is too low, the degree of crystallinity of the surface of the water-soluble film increases, and the number average value and the coefficient of variation of the elastic moduli of the surface of the water-soluble film may become too large. Moreover, the water solubility of the water-soluble film may be impaired. The temperature of the hot air is preferably 75 to 105° C., more preferably 85 to 100° C. Also, the hot air velocity is more preferably 2 to 8 m/sec, and even more preferably 3 to 7 m/sec.

The PVA film cast on the support is dried on the support to the volatile content of preferably 5 to 50% by mass, and then peeled off and further dried if necessary. There is no particular limitation on the drying method, and examples of the method include a method of contacting with a drying oven or a drying roll. When drying with a plurality of drying rolls, it is preferable to alternately contact one side and the other side of the PVA film with the drying rolls in order to homogenize the physical properties of both sides of the resulting water-soluble film. For example, the number of the drying rolls is preferably 3 or more, more preferably 4 or more, and even more preferably 5 to 30. The temperature of the drying oven and the drying rolls is preferably 40 to 110° C. The temperature of the drying oven and the drying rolls is preferably 100° C. or less, more preferably 90° C. or less, and even more preferably 85° C. or less. When the temperature of the drying oven and the drying rolls is too high, the degree of crystallinity of the surface of the water-soluble film increases, and the number average value and the coefficient of variation of the elastic moduli of the surface of the water-soluble film may become too large. Moreover, the water solubility of the water-soluble film may be impaired. On the other hand, the temperature of the drying oven and drying rolls is more preferably 45° C. or more, even more preferably 50° C. or higher. When the temperature of the drying oven and the drying rolls is too low, the degree of crystallinity of the surface of the water-soluble film may become small, and the number average value and the coefficient of variation of the elastic moduli of the surface of the water-soluble film may become too small.

The water-soluble film can be further heat-treated as necessary. By performing heat treatment, it is possible to adjust the strength and water solubility of the film. The heat treatment temperature is preferably 60 to 135° C., and more preferably 60 to 130° C. When the temperature of the heat treatment is too high, the amount of heat applied is too large, the degree of crystallinity of the surface of the water-soluble film increases, and the number average value and the coefficient of variation of the elastic moduli of the surface of the water-soluble film may become too large. Moreover, the water solubility of the water-soluble film may be impaired.

The water-soluble film thus produced is subjected to further humidity control, embossing, cutting of both ends (edges) of the film, and the like as needed, and then wound in a roll on a cylindrical core and moisture-proof packaged to form a product.

The volatile content ratio of the PVA film finally obtained by a series of treatments is not particularly limited, but is preferably 1 to 5% by mass, more preferably 2 to 4% by mass.

<Application>

The water-soluble film of the present invention can be suitably used for various water-soluble film applications. Examples of the above-mentioned film applications include chemical packaging films, liquid pressure transfer base films, embroidery base films, release films for forming artificial marble, seed packaging films, waste storage bag films, and the like. Among these, the water-soluble film of the present invention is preferably used as the chemical packaging film because the effects of the present invention are exhibited more remarkably, and in particular, it is preferably used as an oxidizable chemical packaging film.

When the water-soluble film of the present invention is used as the chemical packaging film, the types of chemicals include, for example, pesticides, detergents (including bleaching agents), disinfectants, and the like. The physical properties of the chemical are not particularly limited, and may be acidic, neutral, or alkaline. In addition, the chemical may contain a boron-containing compound. The chemical may be in the form of powder, mass, gel or liquid. The form of packaging is also not particularly limited, and the form of unit packaging (preferably sealed packaging) in which the chemical is packaged by unit amount is preferred. The package of the present invention is obtained by applying the water-soluble film of the present invention to the chemical packaging film to package the chemical.

EXAMPLES

Hereinafter, the present invention will be specifically described below with reference to examples and the like, but the present invention is not limited by the following examples. Evaluation items and evaluation methods adopted in the following examples and comparative examples are as follows.

(1) Number Average Value and Coefficient of Variation of Elastic Modulus of Water-Soluble Film The square A1 film with each side of 1 cm was cut from a central portion in a width direction (TD direction) of the water-soluble film obtained in the following examples or comparative examples. The film was cut so that a shortest distance between an intersection of diagonals of the square A1 and a straight line bisecting the width direction (TD direction) of the water-soluble film was 0.1 cm. Then, the cut square A1 film was set on a measurement base via a double-sided tape. In this square A1 film, the area of the square A2 with a side of 5 μm was selected, and the elastic modulus of the surface of the water-soluble film was measured with an atomic force microscope. For the measurement, each side of the square A2 was equally divided into 64, the entire square A2 was divided into 4096 pixels, and the elastic modulus of the surface of the water-soluble film was measured for each pixel with the atomic force microscope. Here, the square A2 has a total of 5 points, that is, the central portion of the square A1 and the four vertices, and among the five squares A2, the central portion was defined as square A2(1), and the vertices were defined as square A2(2), square A2(3), square A2(4) and square A2(5), respectively.

Specifically, the measurement was performed with the atomic force microscope in the Peak Force QNM mode set for the following measurement equipment, and the resulting force curve was analyzed using the attached analysis software, based on the JKR contact theory. By this analysis, the elastic modulus distributions of the square A2(1), the square A2(2), the square A2(3), the square A2(4) and the square A2(5) were determined. This elastic modulus distributions are obtained by plotting the position of each of 4096 pixels on the x-axis and y-axis and plotting the elastic modulus value of each pixel at each position on the z-axis in a three-dimensional graph of xyz axes. From this elastic modulus distributions, for each of the square A2(1), the square A2(2), the square A2(3), the square A2(4) and the square A2(5), the number average value and the standard deviation (σ) of 4096 elastic moduli were calculated to obtain the coefficient of variation (σ/number average value).

(2) Atomic Force Microscope Measurement Conditions

The measurement conditions for the atomic force microscope were set as follows.

Measuring device: DimensionIcon (manufactured by Burker Corporation)

Analysis software: Nano Scope Analysis V1.40 (analysis software attached to the device)

Cantilever: OTESPA-R3 (nominal spring constant value 26 N/m)

Ramp rate: 3.0 Hz

Measurement range: 5 μm×5 μm

Number of measured pixels: 64×64=4096 pixels (3) Complete Dissolution Time of Water-Soluble Film The complete dissolution time of the water-soluble film in deionized water at 10° C. was determined by the method described above.

(4) Transportation Test of Water-Soluble Film Package

Two 100 mm×100 mm samples were cut out from the water-soluble film obtained in the following examples or comparative examples, and they were stacked and water-sealed on three sides to create a pouch. Sealing was performed twice using a sealer of 10 mm, so that the width of each sealed portion was 20 mm. About 50 g of detergent was put into this pouch, and the upper part (mouth part) of the pouch was water-sealed to produce a package. As with the other three sides, the opening was sealed twice with a 10 mm sealer to make the width of each sealed portion 20 mm. As a result, a package with four corners protruding was obtained. Further, the composition of the detergent was 8% by mass of monoethanolamine, 24% by mass of dodecylbenzenesulfonic acid, 20% by mass of oleic acid, 24% by mass of lauryl alcohol ethoxylate, 9% by mass of propylene glycol, 9% by mass of diethylene glycol, and 6% by mass of water.

Next, 100 packages obtained and 30 cubic wooden pieces of 30 mm×30 mm×30 mm were packed in a 70 L polyethylene bag and placed in a cardboard box (520 mm×335 mm×325 mm). The gap between the polyethylene bag and the cardboard box was filled with cushioning material. Then, the cardboard box containing the package was loaded on a truck, and a transportation test was conducted by making 10 round trips between Okayama Prefecture and Tokyo. The packages after transportation were visually observed to determine the total number of packages with holes.

Example 1

100 parts by mass of PVA (degree of saponification: 88 mol %, degree of polymerization: 1700) obtained by saponifying polyvinyl acetate, 50 parts by mass of glycerin as a plasticizer, 2.0 parts by mass of lauric acid diethanolamide as a surfactant and water was put into a twin-screw extruder to prepare a film forming stock solution having a volatile content of 60% by mass. After filtering the film forming stock solution with a 450-mesh filter, the film forming stock solution was discharged from a T-die and cast, and dried by blowing hot air at 95° C. at a speed of 5 m/sec over the entire non-contact surface of the support with a surface temperature of 90° C. to obtain a PVA film. Next, the PVA film was then peeled off from the support and dried from the first drying roll to the final drying roll (19th drying roll) so that one side and the other side of the PVA film alternately contacted each drying roll. The surface temperatures from the first drying roll to the final drying roll were all 80° C. Thus, a water-soluble film (thickness: 35 μm, length: 1200 m, width: 1 m) was obtained.

In each of the five squares A2 (the square A2(1), the square A2(2), the square A2(3), the square A2(4), the square A2(5)) of the obtained water-soluble film, the elastic modulus of each pixel was measured with the atomic force microscope, and the number average value and the coefficient of variation were obtained. In addition, the complete dissolution time of the resulting water-soluble film in water at 10° C. was measured, and a transportation test was conducted. Table 1 shows the evaluation results.

Comparative Example 1

A water-soluble film was obtained in the same manner as in Example 1, except that the surface temperature of the support was changed to 105° C. and the temperature of the hot air blown over the entire non-contact surface with the support was changed to 110° C. Also, in the same manner as in Example 1, the water-soluble film was measured and evaluated. Table 1 shows the evaluation results.

Example 2

A water-soluble film was obtained in the same manner as in Example 1, except that the PVA was changed to methyl maleate (hereinafter, may be referred to as "MA")-modified PVA (degree of saponification: 93 mol %, degree of polymerization: 1700, degree of MA modification: 5 mol %) obtained by saponifying polyvinyl acetate. Also, in the same manner as in Example 1, the water-soluble film was measured and evaluated. Table 1 shows the evaluation results.

Comparative Example 2

A water-soluble film was obtained in the same manner as in Example 2, except that the surface temperature of the support was changed to 65° C. and the temperature of the hot air blown over the entire non-contact surface with the support was changed to 70° C. Also, in the same manner as in Example 1, the water-soluble film was measured and evaluated. Table 1 shows the evaluation results.

Comparative Example 3

A water-soluble film was obtained in the same manner as in Example 1, except that the degree of saponification of PVA was changed to 98 mol %. Also, in the same manner as in Example 1, the water-soluble film was measured and evaluated. Table 1 shows the evaluation results.

Comparative Example 4

A water-soluble film was obtained in the same manner as in Example 1, except that the membrane-forming stock solution was filtered through a 30-mesh filter. Also, in the same manner as in Example 1, the water-soluble film was measured and evaluated. Table 1 shows the evaluation results.

TABLE 1

| | | | Example 1 | Example 2 | Comparative Example 1 | Comparative Example 2 | Comparative Example 3 | Comparative Example 4 |
|---|---|---|---|---|---|---|---|---|
| PVA | Degree of modification [mol %] | | None | MAS | None | MAS | None | None |
| | Degree of saponification [mol %] | | 88 | 93 | 88 | 93 | 98 | 88 |
| Film forming conditions | Filter medium for film forming stock solution [mesh] | | 450 | 450 | 450 | 450 | 450 | 30 |
| | Temperature of support [° C.] | | 90 | 90 | 105 | 65 | 90 | 90 |
| | Temperature of hot air [° C.] | | 95 | 95 | 110 | 70 | 95 | 95 |
| Elastic modulus of water-soluble film | Average value of elastic modulus of each pixel [MPa] | Square A2(1) | 156 | 23 | 215 | 17 | 271 | 156 |
| | | Square A2(2) | 164 | 24 | 225 | 16 | 255 | 173 |
| | | Square A2(3) | 134 | 21 | 211 | 17 | 291 | 182 |
| | | Square A2(4) | 130 | 27 | 209 | 21 | 283 | 131 |
| | | Square A2(5) | 148 | 22 | 214 | 13 | 265 | 125 |
| | Coefficient of variation of elastic modulus of each pixel | Square A2(1) | 0.56 | 0.28 | 0.33 | 0.82 | 0.31 | 0.96 |
| | | Square A2(2) | 0.25 | 0.26 | 0.34 | 0.92 | 0.28 | 0.90 |
| | | Square A2(3) | 0.25 | 0.30 | 0.32 | 0.98 | 0.39 | 1.05 |
| | | Square A2(4) | 0.21 | 0.31 | 0.30 | 0.72 | 0.25 | 0.98 |
| | | Square A2(5) | 0.35 | 0.26 | 0.37 | 0.76 | 0.29 | 0.95 |
| Complete dissolution time [s] | | | 29 | 19 | 88 | 15 | >600 | 44 |
| Number of holes formed in transportation test [pieces] | | | 0 | 1 | 28 | 19 | 5 | 20 |

As is clear from Table 1, the water-soluble film of the present invention can suppress the formation of holes when used as a package while maintaining water-solubility. Therefore, the water-soluble film of the present invention can be suitably used for various water-soluble film applications. In particular, the water-soluble film of the present invention is suitable as a chemical packaging film, and suitable as a package for packaging pesticides, detergents (including bleach), disinfectants, and the like.

EXPLANATION OF REFERENCE NUMERAL

- 1: Water-soluble film
- 2: Square A1
- 3: Square A2
- 31: Square A2 positioned at one vertex of square A1
- 32: Square A2 positioned at one vertex of square A1
- 33: Square A2 positioned at one vertex of square A1
- 34: Square A2 positioned at one vertex of square A1
- 35: Square A2 positioned in the central portion of square A1
- 4: line that bisects width direction (TD direction) of water-soluble film
- 51: Diagonal of square A1
- 52: Another diagonal of square A1
- 6: Width direction of water-soluble film (TD direction)
- 7: Machine flow direction (MD direction) of water-soluble film

What is claimed is:

1. A water-soluble film containing a polyvinyl alcohol resin, wherein within a square A1 with a side of 1 cm or more and 5 cm or less positioned at an arbitrary location on at least one surface of the water-soluble film, each side of an area of square A2 with a side of 5 μm is divided into 64 to divide the entire area into 4096 pixels, and when elastic moduli of the pixels are measured by an atomic force microscope, a number average value of the elastic moduli of the pixels is 1 to 200 MPa, and a coefficient of variation of the elastic moduli of the pixels is 0.1 to 0.7, wherein the water-soluble film is prepared by a method comprising filtering a film forming stock solution containing the polyvinyl alcohol resin through a filter medium, wherein the filter medium has from 300 to 475 mesh.

2. The water-soluble film as claimed in claim 1, wherein the square A1 is positioned in a central portion of a width direction of the water-soluble film.

3. The water-soluble film as claimed in claim 1, wherein the square A2 is positioned in at least one central portion or vertex of the square A1.

4. The water-soluble film as claimed in claim 3, wherein the square A2 is positioned at the central portion and four vertices of the square A1.

5. The water-soluble film as claimed in claim 1, wherein the side of the square A1 is 1 cm.

6. The water-soluble film as claimed in-claim 1, wherein the number average value of the elastic moduli is from 1 to 200 MPa and the coefficient of variation of the elastic moduli is from 0.1 to 0.7 on both surfaces of the water-soluble film.

7. A package in which the water-soluble film as claimed in claim 1 stores a chemical.

8. The package as claimed in claim 7, wherein the chemical is a pesticide, a detergent or a disinfectant.

9. The package as claimed in claim 7, wherein the chemical is in a liquid form.

10. The water-soluble film as claimed in claim 1, wherein the water-soluble film is prepared by a method comprising:

contacting a support with a film forming stock solution containing the polyvinyl alcohol resin, wherein a surface temperature of the support is from 60 to 100° C.; and blowing hot air on the film forming stock solution, wherein a temperature of the hot air is from 75 to 105° C.

11. The water-soluble film as claimed in claim 10, wherein a wind speed of the hot air is from 1 to 10 m/sec.

12. The water-soluble film as claimed in claim 1, wherein a complete dissolution time of the water-soluble film in water at 10° C. is 90 seconds or less.

13. The water-soluble film as claimed in claim 1, further comprising a plasticizer, wherein the plasticizer comprises at least one polyhydric alcohol selected from the group consisting of ethylene glycol, glycerin, diglycerin, propylene glycol, diethylene glycol, triethylene glycol, tetraethylene glycol, trimethylolpropane, and sorbitol.

14. The water-soluble film as claimed in claim 1, further comprising a plasticizer, wherein the plasticizer comprises glycerin.

15. The water-soluble film as claimed in claim 1, further comprising a plasticizer in an amount from 1 to 70 parts by mass with respect to 100 parts by mass of the polyvinyl alcohol resin.

16. The water-soluble film as claimed in claim 1, further comprising a surfactant, wherein the surfactant comprises at least one nonionic surfactant selected from the group consisting of polyoxyethylene lauryl ether, polyoxyethylene oleyl ether, polyoxyethylene octylphenyl ether, polyoxyethylene laurate, polyoxyethylene lauryl amino ether, polyoxyethylene lauric acid amide, polyoxyethylene polyoxypropylene ether, lauric acid diethanolamide, oleic acid diethanolamide, and polyoxyalkylene allyl phenyl ether.

17. The water-soluble film as claimed in claim 1, further comprising a surfactant, wherein the surfactant comprises lauric acid diethanolamide.

18. The water-soluble film as claimed in claim 1, further comprising a surfactant in an amount from 0.01 to 1 part by mass with respect to 100 parts by mass of the polyvinyl alcohol resin.

19. The water-soluble film as claimed in claim 1, wherein the polyvinyl alcohol resin comprises a methyl maleate-modified polyvinyl alcohol resin.

* * * * *